June 13, 1967    A. STIHL ET AL    3,324,971
OIL CONDUIT SYSTEM FOR MOTOR SAWS
Filed Oct. 23, 1964

Inventors
Andreas Stihl
Peter Stihl
Hermann Häse
Karl Gutjahr

United States Patent Office 3,324,971
Patented June 13, 1967

3,324,971
OIL CONDUIT SYSTEM FOR MOTOR SAWS
Andreas Stihl, Rohrbronn, Peter Stihl, Hegnach, Hermann Häse, Stuttgart-Bad Cannstatt, and Karl Gutjahr, Wendlingen, Germany, assignors to Andreas Stihl Maschinenfabrik, Neustadt uber Waiblingen, Germany
Filed Oct. 23, 1964, Ser. No. 405,978
Claims priority, application Germany, Oct. 25, 1963, St 21,228
4 Claims. (Cl. 184—14)

The present invention relates to a lubricant conveying oil conduit arrangement, especially for use in connection with motor chain saws in which oil is conveyed from an oil tank or reservoir to the chain guiding rail by means of a pump.

With motor chain saws of the above-mentioned type, it has heretofore been customary to employ a first conduit forming the suction line for conveying oil from the oil tank to the pump, and also to employ a second conduit forming the pressure line through which oil is conveyed by the pump to the chain guiding rail of the motor chain saw.

It is an object of the present invention to provide a simplified lubricant conveying arrangement, especially for motor chain saws.

It is another object of this invention to provide a lubricant conveying arrangement as set forth above, which will greatly reduce costs and will facilitate the installation of such conduit systems in covers for motor chain saws.

These and other objects and advantages of the invention will appear more clearly from the following specification in connection with the accompanying drawings, in which.

A conduit according to the present invention which, while not limited to, is especially useful in connection with a motor chain saw, is characterized primarily in that it has its ends open and has a section intermediate said ends pressed together substantially oil-tight, which means that for all practical purposes no oil will pass from one side of said pressed together section to the other side thereof, while said conduit is provided with two passages respectively arranged on opposite sides of said pressed together section in spaced relationship to said open ends and leading from the inside to the outside of said conduit.

When employed in connection with a motor chain saw, the simplification brought about by the present invention consists in that between the oil tank and the chain guiding rail, a single oil line consisting of a single piece will suffice, and one portion of the conduit extending from the pressed together section to one end thereof, viz, that end communicating with the oil tank, will serve as suction line while the other portion of the conduit leading from the pressed together section to the other end of the conduit will serve as pressure line. The passages leading from the inside to the outside of the pipe are connected with the suction and pressure sides, respectively, of the lubricating pump.

The said oil conduit when employed for motor chain saw is advantageously cast into a sprocket wheel cover of the motor chain saw, and the lubricant conveying pump is connected in any convenient manner, for instance by screws (not shown) to said cover and communicates with the two branches of the conduit through transverse passages thereof. Such an arrangement greatly facilitates the construction and manufacture of such cover and especially the lubricating system, and represents a particular advantage when the respective parts are made of pressure cast light metal or are produced by injection molding of synthetic material.

Figure 1:
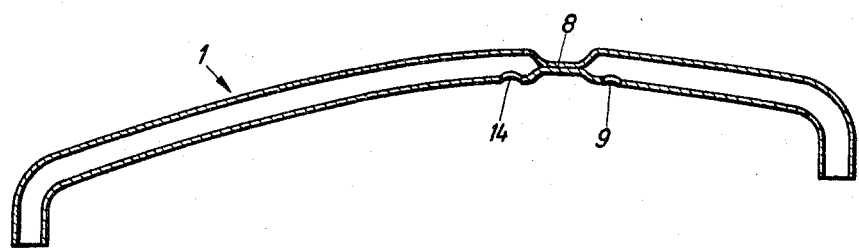
FIGURE 1 illustrates a section through a conduit according to the present invention.
Figure 2:
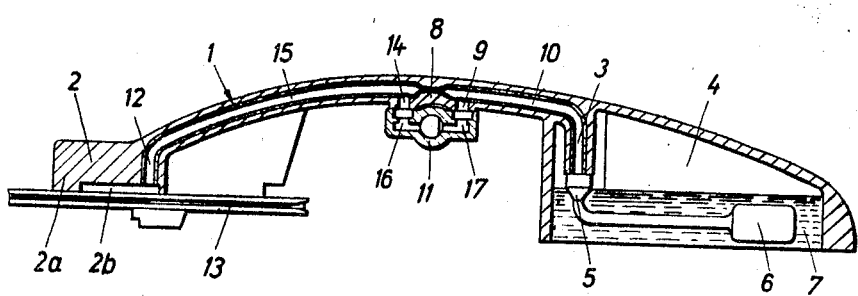
FIGURE 2 is a section through a sprocket wheel cover for a motor saw, which cover has cast thereinto a conduit according to FIGURE 1.

Referring more specifically to the drawing, FIG. 2 shows an oil pipe 1 embedded in a cast sprocket wheel cover 2. One end 3 of oil pipe 1 leads to an oil tank or reservoir 4 in which a rubber hose 5 has one end connected to the end 3 of conduit 1, while the other end of said rubber hose is provided with an oil strainer 6 for immersion into oil 7 in said tank 4. Intermediate the ends 3 and 12 of oil pipe 1, for instance approximately in the central portion of oil pipe 1, there is a pinched section 8 where the pipe has been pressed together in a substantially oil-tight manner so that for all practical purposes, no oil can flow from branch 15 to branch 10 or vice versa. At one side of said section there is a bore 9 extending from the inside of branch 10 to the outside of the pipe, and this bore 9 communicates with the suction bore 17 or intake side of a lubricating pump 11. The pressure side of said pump 11 communicates through a bore 14 similar to the bore 9 and located on the other side of section 8 with the interior of pipe branch 15. The end 12 of branch 15 leads near a chain guiding rail 13 of a motor chain saw so as to provide the same with oil.

As will thus be seen from the drawing, a single pipe 1 furnishes both the suction and the pressure line of the oil or lubricant conveying system in cover 2, flange 2a of which engages the chain guiding rail 13, while being provided with a recess 2b into which leads branch 15 forming the pressure line of the lubricant supply means.

It is, of course, to be understood that the present invention is, by no means, limited to the particular arrangement shown in the drawings, but also comprises any modifications within the scope of the appended claims.

What we claim is:

1. A single piece unitary pipe, especially for use in connection with a lubricant storage chamber, which has its ends open and has a section intermediate said ends pinched together so that the pinched together pipe portions contact each other substantially oil-tight, said pipe being provided with two passages respectively arranged on opposite sides of said pinched together section in spaced relationship to said open ends and leading from the inside to the outside of said pipe.

2. For use in connection with a motor chain saw; a cover having a compartment forming a part of an oil reservoir and also having a flanged portion for engagement with a motor chain saw, and a single piece unitary pipe embedded in said cover and having both ends thereof open and respectively leading into said compartment and through said flange for feeding oil to the chain guiding member of the motor chain saw to be engaged by said cover, said pipe having a section intermediate said ends pinched together so that the pinched together pipe portions contact each other substantially oil-tight, said pipe being provided with two passages respectively arranged on opposite sides of said pinched together section in spaced relationship to said ends and leading from the inside to the outside of said pipe for connection with the suction and pressure sides respectively of a lubricant pump.

3. An arrangement according to claim 2 which includes an oil pump connected to said cover and having its suction side connected to that passage which communicates with said compartment, and having its pressure side connected to that passage which communicates with the pipe end at said flanged portion.

4. An arrangement according to claim 3, in which said flanged portion is provided with a recess forming an oil collecting chamber and communicating with the adjacent end of said pipe.

References Cited

UNITED STATES PATENTS 3,010,538 11/1961 Strunk _____ 184—15
3,068,961 12/1962 Stihl _____ 184—15 X

FOREIGN PATENTS 1,011,887 4/1952 France.

LAVERNE D. GEIGER, Primary Examiner.

H. S. BELL, Assistant Examiner.